US009871757B1

(12) United States Patent
Reardon

(10) Patent No.: US 9,871,757 B1
(45) Date of Patent: Jan. 16, 2018

(54) SHARING USER-GENERATED CONTENT TO EXTERNAL SOCIAL NETWORKS

(75) Inventor: James P. Reardon, Seattle, WA (US)

(73) Assignee: Google LLC, Mountain View, CA (US)

(*) Notice: Subject to any disclaimer, the term of this patent is extended or adjusted under 35 U.S.C. 154(b) by 357 days.

(21) Appl. No.: 13/269,343

(22) Filed: Oct. 7, 2011

(51) Int. Cl.
H04L 12/58 (2006.01)

(52) U.S. Cl.
CPC .......... H04L 51/32 (2013.01); H04L 51/046 (2013.01); H04L 51/063 (2013.01); H04L 51/066 (2013.01); H04L 51/14 (2013.01); H04L 51/36 (2013.01)

(58) Field of Classification Search
CPC ....... G06Q 50/01; H04L 12/588; H04L 51/32; H04L 51/36; H04L 51/066; H04L 51/063; H04L 51/046; H04L 51/14
USPC ............... 709/204, 219, 225; 715/739, 249; 705/319
See application file for complete search history.

(56) References Cited

U.S. PATENT DOCUMENTS

| 6,130,938 | A | 10/2000 | Erb |
| 6,192,119 | B1 | 2/2001 | Wilson |
| 6,697,478 | B1 | 2/2004 | Meldrum et al. |
| 6,754,322 | B1 | 6/2004 | Bushnell |
| 7,106,848 | B1 | 9/2006 | Barlow et al. |
| 7,366,990 | B2 | 4/2008 | Pitroda |
| 7,555,110 | B2 | 6/2009 | Dolan et al. |
| 7,610,287 | B1 | 10/2009 | Dean et al. |
| 7,742,468 | B2 | 6/2010 | Vagelos |
| 9,021,113 | B2* | 4/2015 | Carr ................ G06Q 50/01 709/227 |
| 2002/0137490 | A1 | 9/2002 | Gallant |
| 2002/0143874 | A1 | 10/2002 | Marquette et al. |
| 2004/0258220 | A1 | 12/2004 | Levine et al. |
| 2005/0152521 | A1 | 7/2005 | Liljestrand |
| 2006/0026288 | A1 | 2/2006 | Acharya et al. |
| 2006/0077957 | A1 | 4/2006 | Reddy et al. |
| 2006/0206604 | A1 | 9/2006 | O'Neil et al. |

(Continued)

FOREIGN PATENT DOCUMENTS

WO  WO0279984  10/2002

OTHER PUBLICATIONS

Shetty, Nischal, "Selective Twitter—update FaceBook status from twitter", Mar. 12, 2009, http://www.twi5.com/selective-twitter-update-facebook-status-from-twitter/1860/, pp. 1-2.*

(Continued)

Primary Examiner — Gregory Todd
(74) Attorney, Agent, or Firm — Patent Law Works LLP

(57) ABSTRACT

A system and method for sharing user-generated content to external social networks from a primary social network by treating them as contacts is disclosed. The system includes an authenticator, a contact generator, a link establisher, and a content copier. The authenticator receives an address and user credentials for external social network websites. The contact generator generates virtual contacts for each of the external social networks. The link establisher identifies external social networks targeted for sharing on the primary social network and creates a link to the accounts. The content copier modifies user-generated content on the primary social network to match native settings on the external social network accounts before posting to them.

20 Claims, 7 Drawing Sheets

(56) References Cited

U.S. PATENT DOCUMENTS

| | | | |
|---|---|---|---|
| 2007/0127631 | A1 | 6/2007 | Difiglia |
| 2007/0171898 | A1 | 7/2007 | Salva |
| 2007/0173236 | A1 | 7/2007 | Vishwanathan et al. |
| 2007/0248077 | A1 | 10/2007 | Mahle, Jr. et al. |
| 2008/0056475 | A1 | 3/2008 | Brannick et al. |
| 2008/0192656 | A1 | 8/2008 | Vagelos |
| 2011/0022450 | A1* | 1/2011 | Meredith ............. 705/14.4 |
| 2011/0038367 | A1* | 2/2011 | Landers et al. .......... 370/352 |
| 2011/0098156 | A1 | 4/2011 | Ng et al. |
| 2011/0112899 | A1* | 5/2011 | Strutton et al. .......... 705/14.41 |
| 2011/0125793 | A1* | 5/2011 | Erhart et al. ............ 707/776 |
| 2011/0252108 | A1* | 10/2011 | Morris et al. ............ 709/206 |
| 2011/0258303 | A1* | 10/2011 | Nath et al. ............. 709/223 |
| 2011/0289574 | A1* | 11/2011 | Hull et al. ............. 726/7 |
| 2012/0066082 | A1* | 3/2012 | Sadler ............... 705/26.1 |
| 2012/0066613 | A1* | 3/2012 | Berger ............. G06Q 30/01 715/751 |
| 2012/0131102 | A1* | 5/2012 | Gabos et al. ........... 709/204 |
| 2012/0158845 | A1* | 6/2012 | Baalu et al. ........... 709/204 |
| 2012/0179764 | A1* | 7/2012 | Erdal ................ 709/206 |
| 2012/0197976 | A1* | 8/2012 | Welingkar et al. ........ 709/203 |
| 2012/0265758 | A1* | 10/2012 | Han et al. ............. 707/737 |
| 2012/0284649 | A1* | 11/2012 | Levy ................ 715/753 |
| 2012/0324121 | A1* | 12/2012 | Carr ............... G06Q 50/01 709/229 |
| 2013/0006602 | A1* | 1/2013 | Zhu et al. ............ 704/2 |
| 2013/0091204 | A1* | 4/2013 | Loh et al. ............ 709/204 |

OTHER PUBLICATIONS

Gummelt, Michael, "Publishing to Twitter from Facebook Pages", Aug. 20, 2009, http:www.facebook.com/blog/blog.php-?post=123006872130, pp. 1.*

Tweetymail, "The Tweetymail User Guide", Jul. 4, 2011, pp. 1-6.*

Cozma, Nicole, "Update Facebook status via e-mail", Sep. 8, 2011, pp. 1-3.*

Van Grove, Jennifer, "Twiiter to Facebook: 5 Ways to Post to Both", May 25, 2009, http://mashable.com/2009/05/25/twitter-to-facebook, pp. 1-6.*

Nash, Adam, "Find and Follow Your LinkedIn Connections on Twitter", May 25, 2010, http://blog.linkedin.com/2010/05/25/find-and-follow-your-linkedin-connections-on-twitter/, p. 1-5.*

Ping.fm Help and Information Wiki, May 2009, pp. 1-6. http://pingfm.pbworks.com/w/page/16881278/Posting%20With%20IM%20Bots.*

Adamic et al., "A Social Network Caught in the Web," Internet Journal, First Monday, Jun. 2, 2003, vol. 8, No. 6, pp. 1-22.

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Murchu et al., "Online Social and Business Networking Communities," Digital Enterprise Research Institute DERI Technical Report, National University of Ireland, Aug. 11, 2004, 22 pgs.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twigger, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

* cited by examiner

SHARING USER-GENERATED CONTENT TO EXTERNAL SOCIAL NETWORKS

BACKGROUND

The specification relates to sharing user-generated content to external social networks. In particular, the specification relates to adding external social networks as contacts on a primary social network and sharing user-generated content to the external social networks from the primary social network.

Social network users are faced with many choices. They can create text and share links on social network applications such as microblogs, generate blog posts, interact on forums, etc. As the number of options increases, users dislike having to repost the same content on multiple websites. It is time consuming for a user to copy and paste the same content to different social networks every time the user wants to share with online social contacts. Existing social networks help users to overcome this problem by relying on external applications like browser extensions and third-party server side applications to post user-generated content to different social networks. This technique, however, has numerous drawbacks.

First, installing a browser extension or using a third-party server side application for each social network is a waste of resources and does not allow the granularity of sharing. Second, installing the application requires manual interaction to enable sharing to other social network accounts. For example, a browser extension that adds a button for a user to click to share a specific post from a primary social network to other social network accounts simultaneously requires that the button be clicked every time the post is shared. Thus, what is needed is a more efficient way to share user-generated content with external social network accounts without relying on external applications.

SUMMARY OF THE INVENTION

In some examples, the specification describes a system and method for sharing user-generated content to external social network accounts simultaneously from a primary social network by treating them as contacts. In one embodiment, an authenticator receives an address and user credentials of an external social network and stores them in the memory after authenticating them. A contact generator generates a virtual contact for the authenticated social network website for addition to a primary social network. A link establisher identifies the external social network targeted for sharing user-generated content on the primary social network and creates a link to those identified social network accounts using at least one of a username and password, a token, a personal identification number or biometric authentication retrieved from the memory and authorizing the primary social network to post to those accounts simultaneously. A content copier analyzes the native settings on the external social network and modifies the user-generated content to match the settings before posting. The content copier posts user-generated content to the external social network which comprises one from the group of internet forums, micro-blogs, weblogs, video-sharing websites, music-sharing websites, photography websites, collaborative projects and virtual worlds. The user-generated content comprises at least one from the group of blogs, instant messages, photos, videos, audio, posts, comments, reviews, advertising and document presentation.

In one embodiment, the virtual contact for the external social network is added to at least one group on the primary social network. A group is created to organize social contacts to real-life social connections, for example, family, work, alumni and music buddies. The user then shares content by specifically targeting that group on the primary social network. The content is shared with other regular social contacts added to that group and is posted to the external social network account presented as a virtual contact in that group. In another embodiment, the user-generated content is tagged for sharing to external social networks by prefixing the corresponding virtual contact with a hash symbol in the user-generated content while sharing on the primary social network.

The specification includes a method for generating virtual contacts of external social network accounts by receiving the website address of an external social network, receiving user credentials for the external social network, authenticating the external social network, generating a virtual contact for the external social network on a primary social network, and adding the virtual contact to the primary social network. The specification also includes another method for sharing user-generated content to the external social network by identifying at least one virtual contact targeted for sharing on a primary social network, creating a link to a corresponding external social network for the virtual contact, determining native settings on the corresponding external social network, modifying the user-generated content to match the native settings, and posting the user-generated content to the external social network.

BRIEF DESCRIPTION OF THE DRAWINGS

The specification is illustrated by way of example, and not by way of limitation, in the figures of the accompanying drawings in which like reference numerals are used to refer to similar elements.

DETAILED DESCRIPTION

Figure 1:
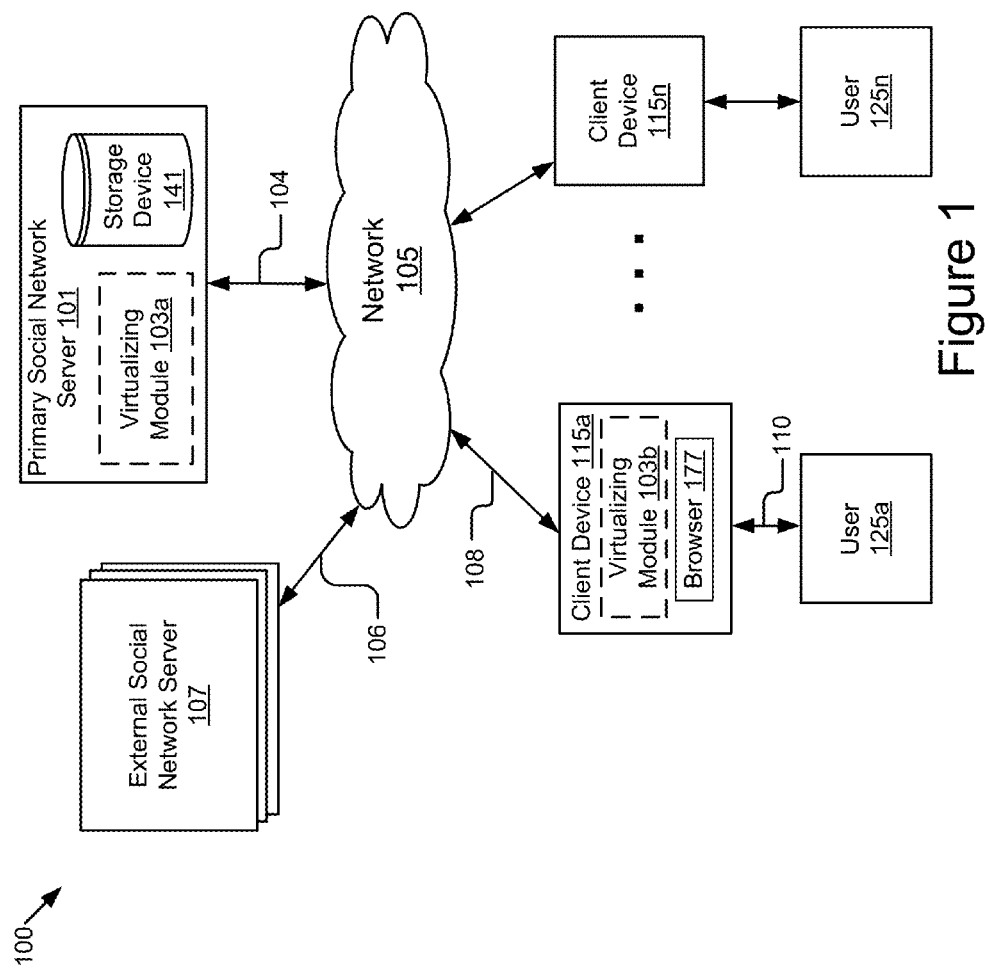
FIG. 1 is a high-level block diagram illustrating one embodiment of a system for adding an external social network as a contact.

A system and method for sharing user-generated content to external social network accounts from a primary social network by treating them as contacts are described below. In the following description, for purposes of explanation, numerous specific details are set forth in order to provide a thorough understanding of the specification. It will be apparent, however, to one skilled in the art that the specification can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the specification. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of an entirely hardware embodiment, an entirely software embodiment, or an embodiment containing both hardware and software elements. In a preferred embodiment, the description is implemented in software, which includes, but is not limited to, firmware, resident software, microcode, etc.

Furthermore, the specification can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

System Overview

FIG. 1 illustrates a block diagram of a system 100 for sharing to external social networks by treating them as contacts on a primary social network according to one example. The system 100 includes client devices 115a, 115n that are accessed by users 125a, 125n, a primary social network server 101 and external social network servers 107. In FIG. 1 and the remaining figures, a letter after a reference number, such as "115a," is a reference to the element having that particular reference number. A reference number in the text without a following letter, such as "115," is a general reference to any or all instances of the element bearing that reference number. In the illustrated embodiment, these entities are communicatively coupled via a network 105.

The external social network server 107 includes social network applications for managing external social networks. A social network is any type of social structure where the users are connected by a common feature. The common feature includes friendship, family, work, an interest, etc. The common features are provided by one or more social networking systems, such as those included in the system 100, including explicitly-defined relationships and relationships implied by social connections with other users, where the relationships are defined in a social graph. The social graph is a mapping of all users in a social network and how they are related to each other. The external social network server 107 is coupled to the network via signal line 106. In one embodiment, the external social network includes internet forums, micro-blogs, weblogs, video-sharing websites, music-sharing websites, photography websites, collaborative project websites, social networking websites, and virtual worlds.

The primary social network server 101 includes a virtualizing module 103a and a storage device 141. The virtualizing module 103a generates a primary social network and virtual contacts that are external social networks. When a user creates a post for the primary social network, the virtualizing module 103a transmits the post to the external social networks for publication. The primary social network server 101 is coupled to the network via signal line 104.

The storage device 141 is a non-transitory memory that stores data such as social data about the user 125a, 125n. The social data describes the user's 125a, 125n actions on one or more social networks and/or other information about the user 125a, 125n such as the user's 125a, 125n gender, age, education, past and present employers, geographic location, family members, friends and the actions of the user's 125a, 125n friends and family members on one or more social networks. In one embodiment, the social data can also include the user's 125a, 125n comments on updates by other users 125a, 125n. In another embodiment, the social data can be stored as a social graph in the storage device 141. In yet another embodiment, the social network server 101 additionally comprises one or more of a processor (not pictured), a clock (not pictured) used to generate timestamps for user comments and other components conventional to a hardware server device. The client devices 115a, 115n in FIG. 1 are used by way of example. While FIG. 1 illustrates two devices, the specification applies to any system architecture having one or more client devices. Furthermore, while only one network 105 is coupled to the client devices 115a, 115n, the primary social network server 101 and the external social servers 107, in practice any number of networks 105, can be connected to the primary social network server 101 and the external social network servers 107.

The client device 115a, 115n is any computing device that includes a memory and a processor, such as a personal computer, a laptop, a smartphone, a cellular phone, a personal digital assistant (PDA), etc. The client device 115a accesses the network 105 via signal line 108. The user 125a interacts with the client device 115a as represented by signal line 110. Client device 115n and user 125n are coupled and interact in a similar manner.

The client device 115a, 115n comprises a browser 177 and, in one embodiment, a virtualizing module 103b. The browser 177 is code and routines stored in a non-transitory computer-readable memory of the client device 115a, 115n and is executed by a processor of the client device 115a, 115n for displaying data retrieved via the network 105. For example, the browser 177 is a browser application such as Google® Chrome. In one embodiment, the virtualizing module 103b is a thin client that works with the browser 177 to display the primary social network and establish virtual contacts. In another embodiment, the virtualizing module 103b works independently from the browser 177 to generate a user interface that is displayed on the client device 115a.

The virtualizing module 103 adds external social networks as contacts on a primary social network. The users enter the addresses and the user credentials associated with the external social network to create a virtual contact to be added to the primary social network. The virtualizing module 103 uses the user credentials to create a link to the external social network accounts authorizing the primary social network to post the same user-generated content. In one embodiment, the virtualizing module 103 posts content to the external social network at the same time that the content is posted to the primary social network. In another embodiment, the virtualizing module 103 posts the content to the external social network after posting the content to the primary social network. The virtualizing module 103 allows personalization, such as assigning the virtual contacts to different user groups (new or existing groups) and tagging of virtual contacts in user-generated content on the primary social network to enable sharing.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or include portions of a telecommunications network for sending data in a variety of different communication protocols. In yet another embodiment, the network 105 includes Bluetooth™ communication networks or a cellular communications network for sending and receiving data such as via short messaging service (SMS), multimedia messaging service (MMS), hypertext transfer protocol (HTTP), direct data connection, WAP, email, etc.

Virtualizing Module 103

Figure 2:
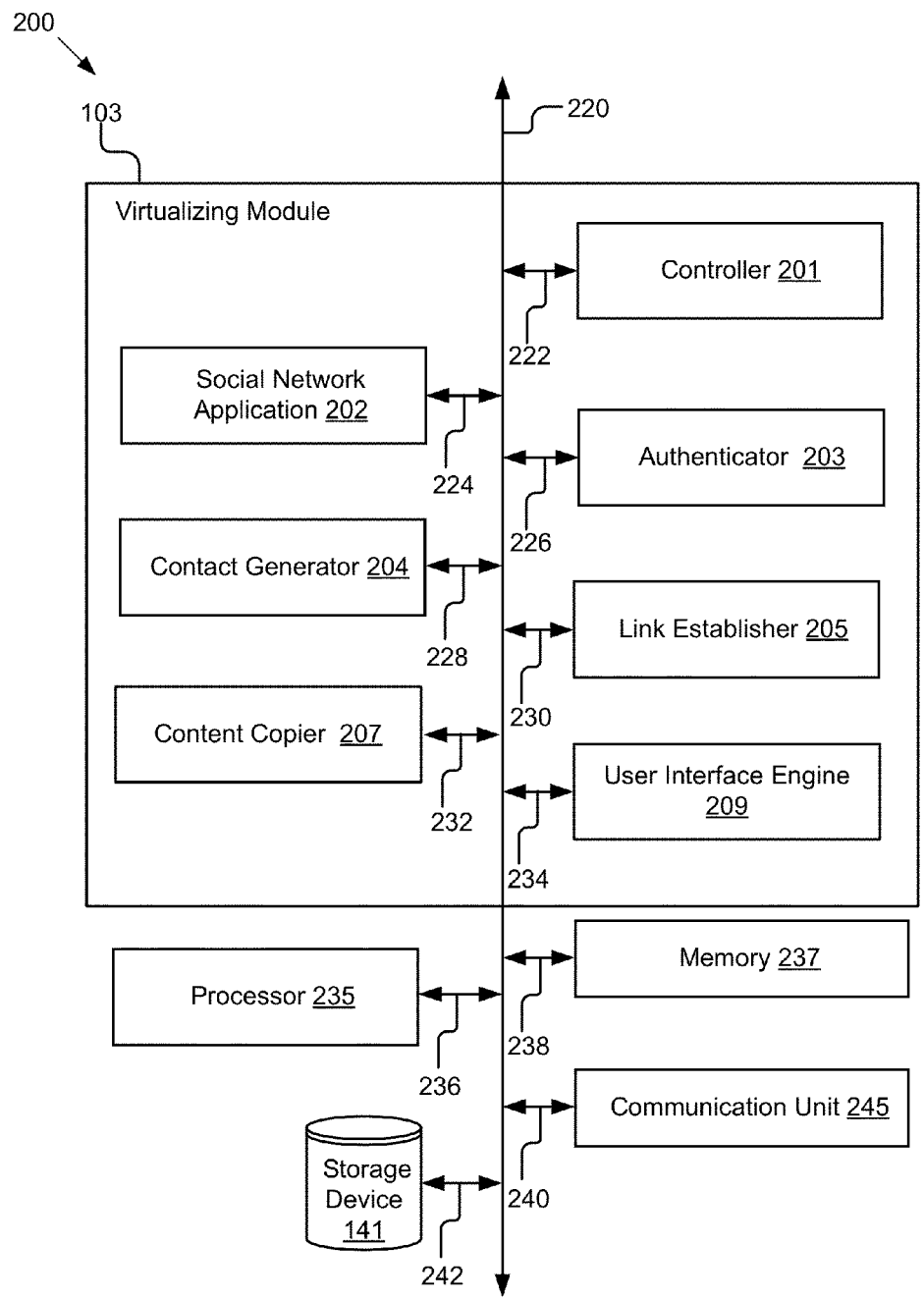
FIG. 2 is a block diagram illustrating one embodiment of a virtualizing module.

Referring now to FIG. 2, the virtualizing module 103 is shown in more detail. FIG. 2 is a block diagram of a computing device 200 that includes the virtualizing module 103, a processor 235, memory 237, and a communication unit 245. For simplicity, the virtualizing module 103 is described as if the computing device 200 is the primary social network server 101 but persons of ordinary skill in the art will recognize that the computing device 200 can also be the client device 115a.

The processor 235 comprises an arithmetic logic unit, a microprocessor, a general purpose controller, or some other processor array to perform computations, provide electronic display signals to a display device. The processor 235 is coupled to the bus 220 for communication with the other components. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays, and physical configurations are possible. The processor 235 is attached to the bus 220 via signal line 236.

The memory 237 stores instructions and/or data that may be executed by the processor 235. The memory 237 is coupled to the bus 220 for communication with the other components. The instructions and/or data may comprise code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. The memory is attached to the bus 220 via signal line 238.

The communication unit 245 transmits and receives data (for example, user information, posts, etc.) to and from the user device 115 and the external social network servers 107. The communication unit 245 is coupled to the bus 220 via signal line 240. In one embodiment, the communication unit 245 includes a port for direct physical connection to the user device 115, the external social network servers 107 or to another communication channel. For example, the communication unit 245 includes a USB, SD, CAT-5 or similar port for wired communication with the user device 115. In another embodiment, the communication unit 245 includes a wireless transceiver for exchanging data with the user device 115, the external social network servers 107 or any other communication channel using one or more wireless communication methods, such as IEEE 802.11, IEEE 802.16, Bluetooth or another suitable wireless communication method.

In yet another embodiment, the communication unit 245 includes a cellular communications transceiver for sending and receiving data over a cellular communications network such as via short messaging service (SMS), multimedia messaging service (MMS), hypertext transfer protocol (HTTP), direct data connection, WAP, e-mail, or another suitable type of electronic communication. In still another embodiment, the communication unit 245 includes a wired port and a wireless transceiver. The communication unit 245 also provides other conventional connections to the network for distribution of files and/or media objects using standard network protocols such as TCP/IP, HTTP, HTTPS, and SMTP as will be understood to those skilled in the art.

In one embodiment, the virtualizing module 103 comprises a controller 201, a social network application 202, an authenticator 203, a contact generator 204, a link establisher 205, a content copier 207, and a user interface engine 209.

The controller 201 is software including routines for receiving data via the communication unit 245, transmitting the data to the appropriate module and transmitting responses from modules to the communication unit 245 for transmission to the client device 115 or the external social network servers 107. In another embodiment, the controller 201 is stored in the memory 237 of the computing device 200 and is accessible and executable by the processor 235. In either embodiment, the controller 201 is adapted for cooperation and communication with the processor 235, the memory 237 and other components of the computing device 200 via signal line 222.

The social network application 202 is software including routines for generating and managing a social network. In another embodiment, the social network application 202 is a set of instructions executable by the processor 235 to provide the functionality described below for generating a social network. In another embodiment, the social network application 202 is stored in the memory 237 of the computing device 200 and is accessible and executable by the processor 235. In either embodiment, the social network application 202 is adapted for cooperation and communication with the controller 201, the processor 235, the memory 237 and other components of the computing device 200 via signal line 224.

In one embodiment, the social network application 202 manages registration of users, creation of a user profile and creation of a social graph that are stored in the storage device 141 via signal line 242. The social network application 202 also manages the association of different actions with the user profile including the publication of posts (e.g., text, links or media) to a selected audience, the publication of comments, indications of approvals (e.g., likes, thumbs up or +1's), uploading of media (e.g., photos, videos, etc.), check-ins to different locations, and other actions associated with a social network.

The authenticator 203 is software including routines for receiving and authenticating the addresses of external social network websites input by the user. In one embodiment, the authenticator 203 is a set of instructions executable by the processor 235 to provide the functionality described below for authenticating external social networks. In another embodiment, the authenticator 203 is stored in the memory 237 and is accessible and executable by the processor 235. In either embodiment, the authenticator 203 is adapted for cooperation and communication with the controller 201, the processor 235, the memory 237, and other components of the computing device 200 via signal line 226.

The authenticator 203 receives an address of at least one external social network website to be virtualized as a contact on a primary social network. In one embodiment, the authenticator 203 receives a single word, for example "socialnetwork," for a website address. The authenticator 203 prepends "http://www." and appends ".com" to the specified word "socialnetwork" for user convenience and checks whether the IP address associated with the server name "www.socialnetwork.com" is valid. In another embodiment, the authenticator 203, upon receiving a website address, authenticates the website's public certificate issued by a trusted certificate authority to ensure a secure connection.

The authenticator 203 also receives user credentials like a username and password, a token, a personal identification number, and biometric authentication in order to obtain proper authorization for the primary social network to log-in and post content into the external social network account on behalf of the user. In one embodiment, the authentication method includes open authentication (OATH). The external social network URL, the associated username and password are stored in association with the user profile in the storage device 141 and can be accessed by the authenticator 203 for managing the account information for the external social networks.

The contact generator 204 is software including routines for generating contacts including virtual contacts for the external social networks received and authenticated by the authenticator 203. In one embodiment, the contact generator 204 is a set of instructions executable by the processor 235 to provide the functionality below for generating contacts. In another embodiment, the contact generator 204 is stored in the memory 237 and is accessible and executable by the processor 235. In either embodiment, the contact generator 204 is adapted for cooperation and communication with the processor 235 and other components of the computing device 200 via signal line 228.

The contact generator 204 generates contacts by associating a profile selected by the user with at least one group. The contacts include people on the primary social network and also virtual contacts for external social networks that the user wishes to share content with from the primary social network. In one embodiment, the contact generator 204 allows the user to add the virtual contact to at least one group on the primary social network in the same way as user contacts (i.e., contacts for people) are added. Once the contact generator 204 creates a contact, the contact generator 204 transmits the relationship between the user and the contact to the social network application 202 for the social network application 202 to incorporate into the social graph.

The contact generator 204 creates groups based on user input to organize social contacts to real-life social connections, for example, family, work, alumni, and music buddies. In one embodiment, the contact generator 204 automatically creates a group that includes a list of all external social networks, including blogs, microblogs, etc. The user shares content by targeting the specific group on the primary social network. The content is shared with other social contacts added to that group on the primary social network as well as posted to the external social network that is present as a virtual contact in that group. In one embodiment, the content includes blogs, instant messages, photos, videos, audio, posts, comments, reviews, advertisements, and document presentation.

In another embodiment, the user-generated content is tagged for sharing to external social networks by prefixing a corresponding virtual contact with a hash symbol in the user-generated content while sharing on the primary social network. This tagging achieves the same intended effect of allowing the user-generated content to be posted to the external social network account from the primary social network. For example, the user includes '#socialnetwork1' in the content to post it to the social network account associated with the tagged virtual contact.

The link establisher 205 is software including routines to identify at least one virtual contact targeted for sharing user-generated content to and creating a link to the corresponding external social network for each of the at least one virtual contact from the primary social network. In one embodiment, the link establisher 205 is a set of instructions executable by the processor 235 to provide the functionality described below for creating a link. In another embodiment, the link establisher 205 is stored in the memory 237 of the computing device 200 and is accessible and executable by the processor 235. In either embodiment, the link establisher 205 is adapted for cooperation and communication with the processor 235 and other components of the computing device 200 via signal line 230.

The link establisher 205 identifies at least one virtual contact that the user targets while sharing content on the primary social network and creates a link to the corresponding external social network for each of the at least one virtual contacts authorizing the primary social network to post to the external social networks. In one embodiment, the link establisher 205 retrieves the username and password corresponding to the targeted external social network account from the storage device 141 to create a link to that specific account to post the user-generated content. In another embodiment, the link establisher 205 identifies the link depth, i.e., the number of clicks required to reach the specific page from the external social network's home page to post the user-generated content. This is useful because in some instances a user clicks through several internal web pages before the posting area is visible. As a result, the link establisher 205 navigates the web pages to reach the appropriate area for posting the content.

The content copier 207 is software including routines for analyzing the native settings on the external social network accounts and modifying the user-generated content from the primary social network to match the settings on the external social network accounts before posting. In one embodiment, the content copier 207 is a set of instructions executable by the processor 235 to copy content from the primary social network. In another embodiment, the content copier 207 is stored in the memory 237 of the computing device 200 and is accessible and executable by the processor 235. In either embodiment, the content copier 207 is adapted for cooperation and communication with the processor 235 and other components of the computing device 200 via signal line 232.

The content copier 207 analyzes the native settings on the external social network accounts to modify the user-generated content being copied from the primary social network to match the native settings. In one embodiment, the content copier 207 changes font and size of the text, restricts the number of characters in the content and also substitutes short aliases for long URLs present in the content for redirection. For example, posting to an external micro blogging platform that has a 140 character limit causes the content copier 207 to restrict the number of characters in the shared content if the limit is exceeded and links back to the original content in the primary social network. In one embodiment, the content copier 207 maintains a list in the storage device 141 of abbreviations and substitutions that the user is willing to accept to shorten the shared content. For example, the user selects from a list of abbreviations that it is acceptable to shorten "government" to "govt" but does not select changing "you" to "U" or "are" to "R." In another embodiment, the content copier 207 changes display resolution, aspect ratio, bit rate, and compression techniques of multimedia content being shared to external social network accounts.

The user interface engine 209 is software including routines for generating a user interface that displays the social network (e.g., posts, photos, videos, comments); general information, such as settings for the primary social network (e.g., privacy, account settings, help); user profiles (e.g., posts, name, education, work history); and an overview of all the virtualizing module 103 features. In one embodiment, the user interface engine 209 is a set of instructions executable by the processor 235 to generate the user interface. In another embodiment, the user interface engine 209 is stored in the memory 237 of the computing device 200 and is accessible and executable by the processor 235. In either embodiment, the user interface engine 209 is adapted for cooperation and communication with the processor 235 and other components of the computing device 200 via signal line 234.

The user interface engine 209 generates an option to display suggested contacts. In one embodiment, the user interface engine 209 generates an icon of different external social networks that are displayed along with the other suggested contacts. Once the user selects the icon, it activates the authenticator 203 to begin the process of requesting authenticating information from the user.

User Interface Engine 209

Figure 3:
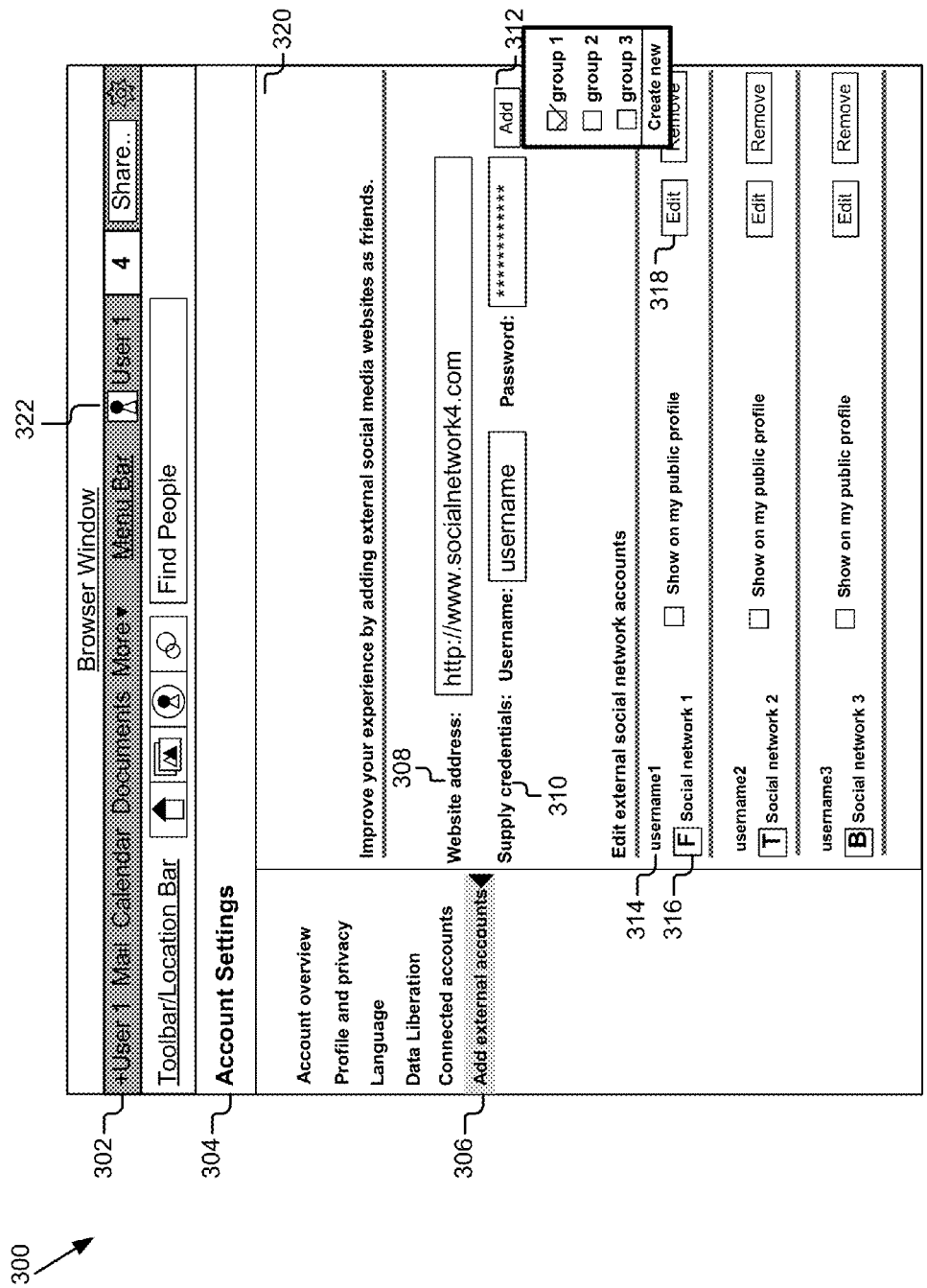
FIG. 3 is a graphic representation of one embodiment of a user interface for adding external social networks as contacts.

Turning now to the user interface engine 209, FIG. 3 is a graphic representation of a user interface 300 generated by the user interface engine 209. In this example, the user interface 300 displays the account settings 304 in the primary social network profile 302 of the user 322. In this example, to add a new social network website, the user selects the add external accounts link 306. The add external accounts link 306 displays a window 320 that includes a website address bar 308 to include the address of the external social network website, to create a virtual contact, a supply credentials option 310 to supply the username and password corresponding to the external social network website and an add option 312 to create and add the contact in any one of the existing groups on the primary social network profile 302. In one embodiment, a new group is created to hold the virtual contact. In this example, the user adds the contact to group 1. In addition, the window 320 also lists the external social network accounts 316 virtualized along with their corresponding usernames 314 and includes an edit option 318 for modifying the credentials if necessary.

Figure 4A:
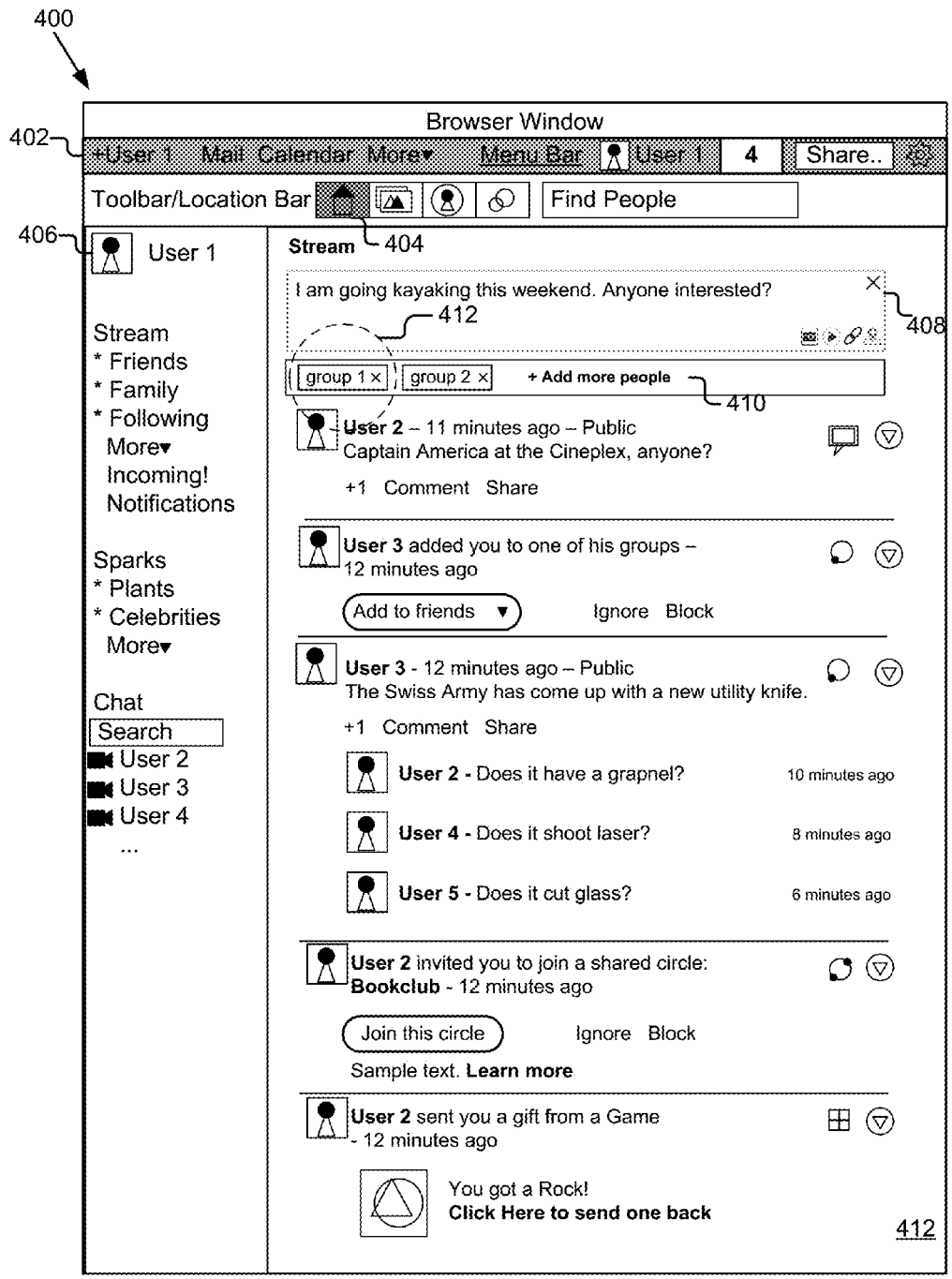
FIG. 4A is a graphic representation of one embodiment of a user interface for sharing user-generated content with contacts.

FIG. 4A is a graphic representation 400 of a user's view of the primary social network website. In this example, the graphic representation 400 displays a homepage 404 in the primary social network profile 402 of the user 406. The user 406 shares content with the contacts by posting to the stream 408 and by clicking the "add more people" link 410 chooses the user groups that can view the content. In one embodiment (not shown), the content gets posted into the external social network account that the user 406 added as a virtual contact to a group 412 previously.

Figure 4B:
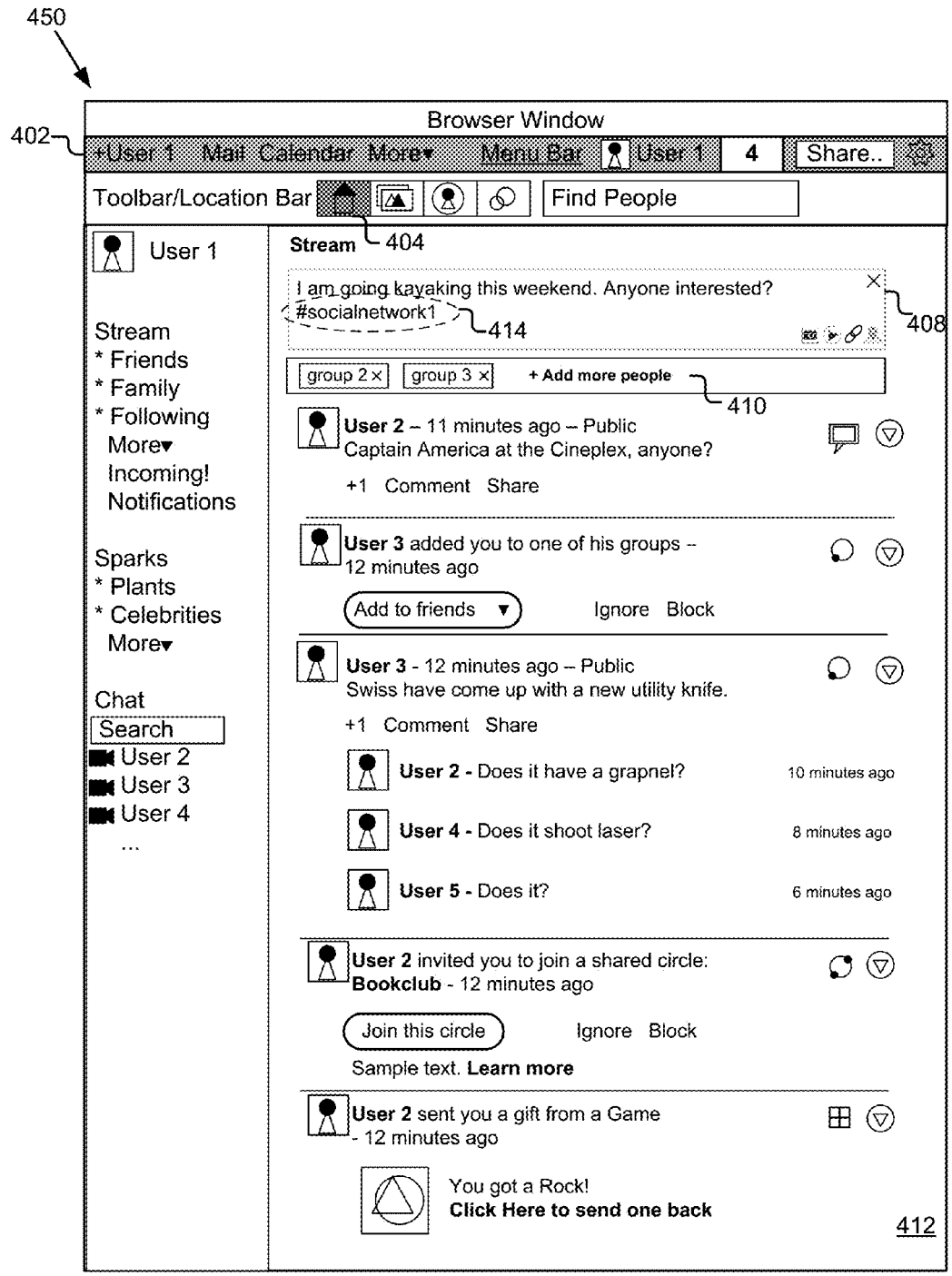
FIG. 4B is a graphic representation of another embodiment of a user interface for sharing user-generated content with groups.

FIG. 4B is another graphic representation 450 of a user's view of the primary social network website. In this embodiment, the user 402 posts content to the external social network account by utilizing a hash tag 414. For example, when the user posts content to the stream 408 that includes "#socialnetwork1," the link establisher 205 identifies the external social network account corresponding to the virtual contact prefixed by a hash tag 414 and creates a link to post into that social network account. In another embodiment, the user employs both a hash tag 414 and the "add more people" link 410 to add groups that contain external social network accounts as virtual contacts to post into them.

Methods

Figure 5:
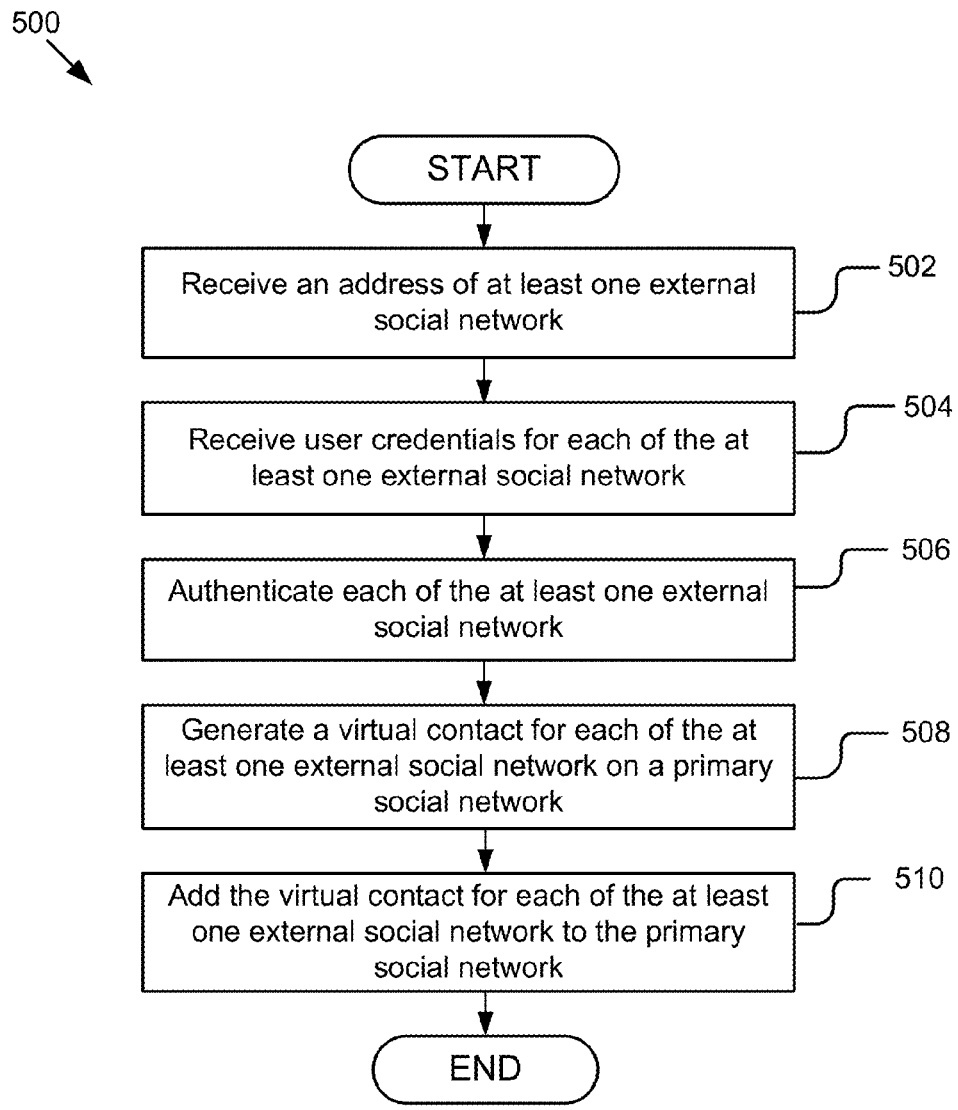
FIG. 5 is a flow diagram of one embodiment of a method for adding external social networks as contacts.
Figure 6:
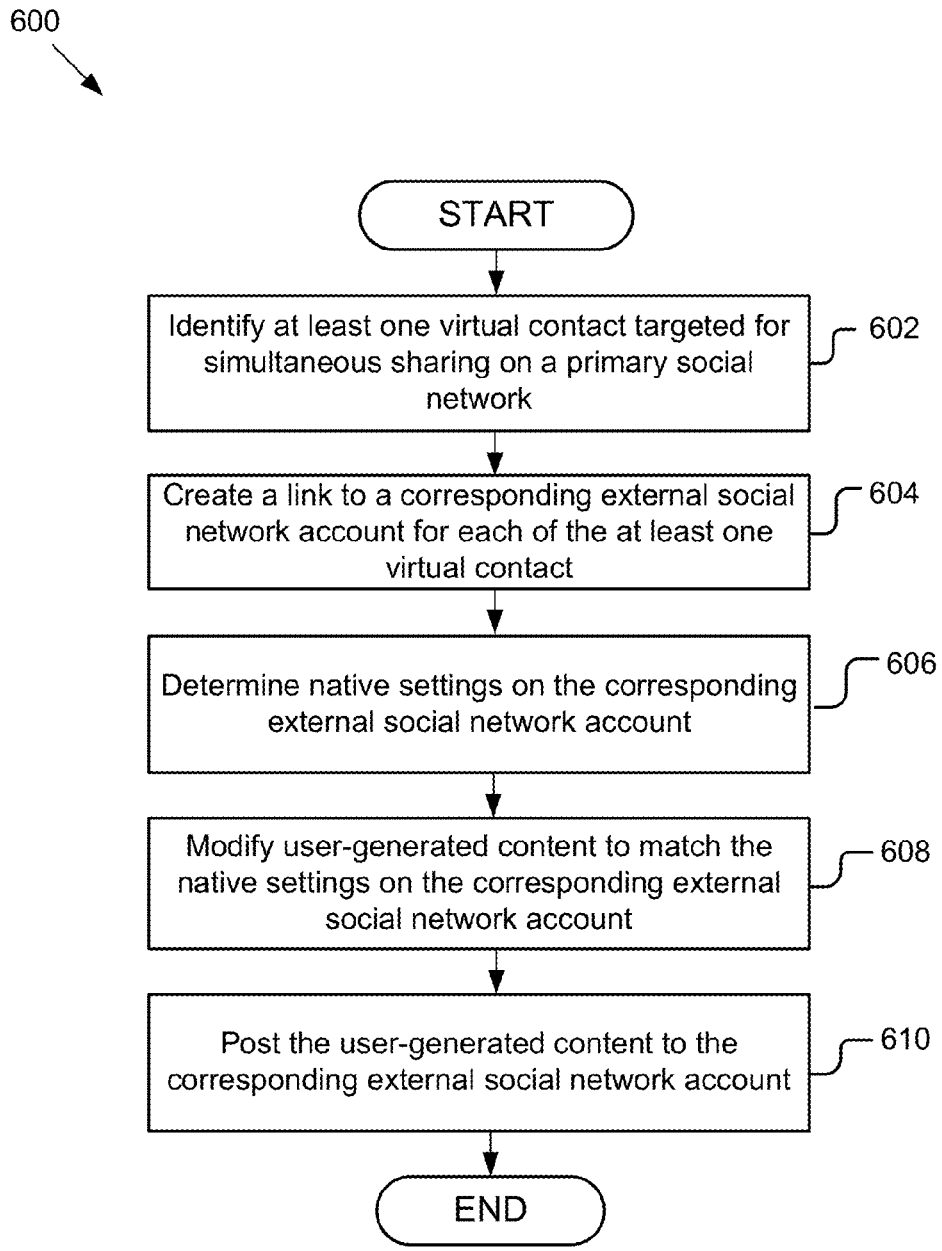
FIG. 6 is a flow diagram of one embodiment of a method for sharing user-generated content to external social network accounts.

Referring now to FIGS. 5-6, two embodiments of the method of the specification will be described. FIG. 5 is a flow diagram 500 of one embodiment of a method for creating a virtual contact for an external social network. The authenticator 203 receives 502 an address of at least one external social network (e.g., a website address) via the controller 201, receives 504 user credentials for each of the at least one external social network and authenticates 506 each of the at least one external social networks. The contact generator 204 generates 508 a virtual contact for each of at least one external social network on a primary social network and adds 510 the virtual contact for each of the at least one external social network to the primary social network.

In one embodiment, the authenticator 203 checks the validity of the IP address associated with a submitted server name. The authenticator 203 then receives the username and password to secure proper authorization to post to external social network accounts on behalf of the user. Once the virtual contacts are created, the contact generator 204 assigns them to one or more groups (either newly created or existing groups) on the primary social network. For example, in one embodiment the contact generator 204 generates an external social network group that the user selects to add to the group.

FIG. 6 is a flow diagram 600 of one embodiment of a method for sharing user-generated content to an external social network account. A user shares content by posting in the primary social network. The link establisher 205 identifies 602 at least one virtual contact targeted for sharing on the primary social network and creates 604 a link corresponding to the external social network for each of at least one virtual contact. In one embodiment, the link establisher 205 identifies link depth, the number of clicks required to reach the specific page from the social network account's home page to post the user-generated content. The content copier 207 determines 606 native settings on the corresponding external social network account, modifies 608 user-generated content to match the native settings on the corresponding external social network account and posts 610 the user-generated content to the corresponding external social network account.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the specification be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies, and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure of is intended to be illustrative, but not limiting, of the scope of the specification, which is set forth in the following claims.

What is claimed is:

1. A computer-implemented method comprising:
   receiving, with one or more processors, a website address for a first external social network of a first user;
   receiving, with the one or more processors, user credentials for an account of the first user on the first external social network;
   authenticating, with the one or more processors at a primary social network, the account of the first user on the first external social network;
   generating on the primary social network, with the one or more processors, a virtual contact for the first external social network in response to authenticating the account of the first user on the first external social network, the virtual contact for use by the first user on the primary social network;
   adding, with the one or more processors, the virtual contact for the first external social network to a first group on the primary social network of the first user, the first group including the virtual contact for the first external social network as a first connection of the first user and an existing user contact for a second user as a second connection of the first user on the primary social network;
   receiving content on the primary social network for sharing to the first group;
   substituting without manual interaction at least one part of the content with a corresponding part preselected by the user from a set of content replacements; and
   responsive to substituting at least one part of the content, sharing the content to the first external social network without manual interaction by posting the content to the first group including the virtual contact, creating a link between the virtual contact and the account of the first user on the first external social network based on identifying a number of clicks to reach a specific page of the first external social network to post the content, and transmitting the content to the specific page of the first external social network through the link.

2. The method of claim 1, further comprising receiving user-generated content on the primary social network from the first user for posting to the first group and posting the user-generated content to the first group.

3. The method of claim 2, further comprising:
incorporating the virtual contact into a social graph of the primary social network that is associated with the first user; and
wherein posting the user-generated content to the first group comprises transmitting the user-generated content to the account of the first user on the first external social network for publication.

4. The method of claim 1 wherein the user credentials comprise at least one of a username and a password, a token, a personal identification number and biometric authentication.

5. The method of claim 1 wherein the first external social network comprises one from the group of internet forums, micro-blogs, weblogs, video-sharing websites, music-sharing websites, photography websites, collaborative project websites, and virtual worlds.

6. The method of claim 1 wherein authenticating the account of the first user on the first external social network comprises validating an IP address, a username and a password, and a public certificate of the first external social network issued by a trusted certificate authority.

7. The method of claim 1, further comprising adding the virtual contact for the first external social network to a second group on the primary social network of the first user, the second group including the virtual contact for the first external social network as a first connection of the first user and an existing virtual contact for an authenticated account of the first user on a second external social network as a second connection of the first user on the primary social network.

8. A system for generating virtual contacts of external social networks, the system comprising:
one or more processors;
an authenticator stored on a memory and executable by the one or more processors, the authenticator for receiving a website address for a first external social network of a first user, receiving user credentials for an account of the first user on the first external social network, and authenticating, at a primary social network, the account of the first user on the first external social network;
a contact generator stored on the memory and executable by the one or more processors, the contact generator for generating on the primary social network a virtual contact for the first external social network in response to authenticating the account of the first user on the first external social network, the virtual contact for use by the first user on the primary social network, and adding the virtual contact for the first external social network to a first group on the primary social network of the first user, the first group including the virtual contact for the first external social network as a first connection of the first user and an existing user contact for a second user as a second connection of the first user on the primary social network; and a content copier stored on the memory and executable by the one or more processors, the content copier for receiving content on the primary social network for sharing to the first group, substituting without manual interaction at least one part of the content with a corresponding part preselected by the user from a set of content replacements, and, responsive to substituting at least one part of the content, sharing the content to the first external social network without manual interaction by posting the content to the first group including the virtual contact, creating a link between the virtual contact and the account of the first user on the first external social network based on identifying a number of clicks to reach a specific page of the first external social network to post the content, and transmitting the content to the specific page of the first external social network through the link.

9. The system of claim 8, wherein the content copier receives user-generated content on the primary social network from the first user for posting to the first group and posts the user-generated content to the first group.

10. The system of claim 9 further comprising a social network application coupled to the contact generator, the social network application for incorporating the virtual contact into a social graph of the primary social network that is associated with the first user and wherein the content copier posting the user-generated content to the first group comprises the content copier transmitting the user-generated content to the account of the first user on the first external social network for publication.

11. The system of claim 8 wherein the user credentials comprise at least one of a username and a password, a token, a personal identification number, and biometric authentication.

12. The system of claim 8 wherein the first external social network comprises one from the group of internet forums, micro-blogs, weblogs, video-sharing websites, music-sharing websites, photography websites, collaborative project websites, and virtual worlds.

13. The system of claim 8 wherein the authenticator authenticates the account of the first user on the first external social network by validating an IP address, a username and a password, and a public certificate of the first external social network issued by a trusted certificate authority.

14. The system of claim 8, wherein the contact generator adds the virtual contact for the first external social network to a second group on the primary social network of the first user, the second group including the virtual contact for the first external social network as a first connection of the first user and an existing virtual contact for an authenticated account of the first user on a second external social network as a second connection of the first user on the primary social network.

15. A computer program product comprising a non-transitory computer useable medium including a computer readable program, wherein the computer readable program when executed on a computer causes the computer to:
receive a website address for a first external social network of a first user;
receive user credentials for an account of the first user on the first external social network;
authenticate, at a primary social network, the account of the first user on the first external social network;
generate on the primary social network a virtual contact for the first external social network in response to authenticating the account of the first user on the first external social network, the virtual contact for use by the first user on the primary social network;

add the virtual contact for the first external social network to a first group on the primary social network of the first user, the first group including the virtual contact for the first external social network as a first connection of the first user and an existing user contact for a second user as a second connection of the first user on the primary social network;

receive content on the primary social network for sharing to the first group;

substitute without manual interaction at least one part of the content with a corresponding part preselected by the user from a set of content replacements; and responsive to substituting at least one part of the content, share the content to the first external social network without manual interaction by posting the content to the first group including the virtual contact, creating a link between the virtual contact and the account of the first user on the first external social network based on identifying a number of clicks to reach a specific page of the first external social network to post the content, and transmitting the content to the specific page of the first external social network through the link.

16. The computer program product of claim 15, wherein the user credentials comprise at least one of a username and a password, a token, a personal identification number, and biometric authentication.

17. The computer program product of claim 15, wherein the computer readable program when executed on the computer further causes the computer to receive user-generated content on the primary social network from the first user for posting to the first group and post the user-generated content to the first group.

18. The computer program product of claim 17, wherein the computer readable program when executed on the computer further causes the computer to incorporate the virtual contact into a social graph of the primary social network that is associated with the first user, and wherein causing the computer to post the user-generated content to the first group comprises transmitting the user-generated content to the account of the first user on the first external social network for publication.

19. The computer program product of claim 15, wherein the first external social network comprises one from the group of internet forums, micro-blogs, weblogs, video-sharing websites, music-sharing websites, photography websites, collaborative project websites and virtual worlds.

20. The computer program product of claim 15, wherein the computer readable program when executed on the computer further causes the computer to add the virtual contact for the first external social network to a second group on the primary social network of the first user, the second group including the virtual contact for the first external social network as a first connection of the first user and an existing virtual contact for an authenticated account of the first user on a second external social network as a second connection of the first user on the primary social network.

* * * * *